United States Patent
Holzer et al.

(10) Patent No.: US 8,632,333 B2
(45) Date of Patent: Jan. 21, 2014

(54) APPARATUS AND METHOD FOR HANDLING A CONTAINER PRODUCT

(75) Inventors: Christian Holzer, Schierling (DE); Konrad Senn, Regensburg (DE)

(73) Assignee: Krones AG, Neutraubling (DE)

(*) Notice: Subject to any disclaimer, the term of this patent is extended or adjusted under 35 U.S.C. 154(b) by 189 days.

(21) Appl. No.: 13/084,747

(22) Filed: Apr. 12, 2011

(65) Prior Publication Data

US 2011/0256256 A1    Oct. 20, 2011

(30) Foreign Application Priority Data

Apr. 19, 2010 (DE) .......................... 10 2010 027 907

(51) Int. Cl.
*B29C 49/36* (2006.01)
*B29C 49/42* (2006.01)

(52) U.S. Cl.
USPC ....... 425/534; 425/540; 198/377.07; 198/394

(58) Field of Classification Search
CPC ................................................. B29C 49/4205
USPC ...................... 198/377.07, 394; 425/534, 540
See application file for complete search history.

(56) References Cited

U.S. PATENT DOCUMENTS

| | | | |
|---|---|---|---|
| 3,997,642 A | | 12/1976 | Yoshikawa et al. |
| 4,212,841 A | * | 7/1980 | Michel ........................ 264/530 |
| 5,035,603 A | * | 7/1991 | Unterlander et al. ......... 425/522 |
| 5,282,526 A | * | 2/1994 | Gibbemeyer ................. 198/376 |
| 5,498,152 A | * | 3/1996 | Unterlander et al. ......... 425/534 |
| 5,863,571 A | * | 1/1999 | Santais et al. ................. 425/526 |
| 6,019,591 A | * | 2/2000 | Valyi ............................. 425/534 |
| 6,531,018 B1 | * | 3/2003 | Fiwek ........................... 156/238 |
| 6,769,895 B2 | * | 8/2004 | Derouault et al. ............ 425/145 |
| 2011/0127141 A1 | * | 6/2011 | Zoppas et al. ........... 198/377.07 |

FOREIGN PATENT DOCUMENTS

| | | |
|---|---|---|
| DE | 000002459653 A1 | 7/1975 |
| DE | 19646365 A1 | 5/1998 |
| DE | 19647260 A1 | 5/1998 |
| DE | 102006012020 A1 | 9/2007 |
| EP | 1261471 A1 | 12/2002 |
| EP | 1279477 A1 | 1/2003 |
| FR | 2736299 A1 | 1/1997 |
| FR | 2842454 A1 | 1/2004 |

OTHER PUBLICATIONS

German Search Report for DE 10 2010 027 907.2 mailed Mar. 1, 2012.

* cited by examiner

*Primary Examiner* — Robert B Davis
(74) *Attorney, Agent, or Firm* — Marshall, Gerstein & Borun LLP

(57) ABSTRACT

An apparatus and a method for handling a container product, in particular a container or a preform for producing a container, where the product is provided with an orientation mark and adapted to be rotated to a predetermined rotary angle position relative to a holder by an orienting means. To do so in a structurally simple and reliable manner, the orienting means are arranged at a transfer site between a holder of a first conveying unit and a holder of a second conveying unit, at which the holders move relative to one another in an accompanying movement, and the rotary movement of the product to the predetermined rotary angle position is derived from the relative movement of the holders.

1 Claim, 7 Drawing Sheets

APPARATUS AND METHOD FOR HANDLING A CONTAINER PRODUCT

CROSS-REFERENCE TO RELATED APPLICATION

The present application claims the benefit of priority of German Application No. 102010027907.2, filed Apr. 19, 2010. The entire text of the priority application is incorporated herein by reference in its entirety.

FIELD OF THE DISCLOSURE

The disclosure relates to an apparatus and method for handling a container product.

BACKGROUND

In plastic container production processes a preform is normally produced first, the preform comprising the amount of material required for the finished container and preferably also the finished neck provided with a thread as well as possibly a collar positioned below the thread, the rest of the preform being, however, smaller and having thicker walls than the finished container. This preform is preferably produced by injection molding. The preform is then inserted into a blow mold and deformed by pressure gas and, where appropriate, mechanical stretching so as to form the finished container. Between the step of injection molding of the preform and the step of blow molding, the preform is preferably heated once more. Inserting the preform into the blow mold with a specific orientation may be advantageous or necessary for a great variety of reasons. This may, for example, become necessary for containers in the case of which anon-rotationally symmetric container, e.g. a container having an oval cross-section, is formed from a rotationally symmetric preform. Here, it will be advantageous to heat the preform areas which are to be stretched more intensively, i.e. the outer areas of the oval, to higher temperatures than the other areas, so that a substantially identical wall thickness will be accomplished everywhere. In this case it will be necessary to insert the preform into the blow mold with an orientation that is exactly adapted to the selectively different degrees of heating. However, it often happens, for a great variety of reasons, that the orientation of the preform changes prior to or during insertion of the preform into the blow mold.

In order to avoid this, many possibilities have been suggested. EP 1 279 477, for example, shows a heating station integrated in the blow molding station and followed by a position regulator which corrects the positions of the preforms once more before the actual blow molding process is carried out. The position regulator includes a sensor which discerns an orientation mark on the preform and detects whether the latter is at a predetermined rotary angle position. If this is not the case, the preform holder, which consists here of a mandrel to which the preform is attached with its opening facing downwards, is driven by a motor via a rack/gear ring transmission. This way of correcting the orientation is comparatively complicated and necessitates electronic control.

Another possibility of making the rotary angle orientation of the preform more uniform or of correcting it is known from EP 1 261 471. In the case of this structural design, the blow mold comprises a ripping device which is inserted into the neck area of the preform within the blow mold and prior to the blow molding process. Via a sensor device, e.g. an optical device, an orientation mark on the preform is detected and the position thereof determined. If this position does not correspond to the predetermined rotary angle position of the preform, the gripping device is rotated via a motor and a pinion/gear transmission. Also this necessitates a comparatively great expenditure.

Another possibility of correcting the orientation can be gathered from DE 196 47 260 A1. In this case, the rotary angle is adjusted, prior to heating the preform, by rotating a holder to which the preform is attached upside down. The neck area of the container is provided with two diametrically opposed projections defining a stop for two adjustment fingers that move parallel to one another and in opposite directions. The adjustment fingers move on both sides over the neck area such that their end faces are diametrically opposed to one another. Subsequently, the carrier is rotated through a rack/gear ring transmission until the closest stop comes into contact with the end face of the adjustment finger. Also this solution is comparatively complicated and, if at all, only suitable for coarse adjustment.

SUMMARY OF THE DISCLOSURE

It is one aspect of the present disclosure to provide an apparatus and a method for handling a container product by means of which a structurally simple and reliable adjustment of the rotary angle position of the product is possible.

Making use of the apparatus and method according to the present disclosure a separate drive for advancing the product to its predetermined rotary angle position and sensors for position monitoring become superfluous. In addition, an interruption in the sequence of method steps, which would be necessary for rotating the product at the angle correction site, can be dispensed with.

The orienting means is preferably associated with the second conveying unit, so as to avoid an error source that may cause a renewed misalignment during transfer to the second conveying unit.

The orienting-means positioning element, which is adapted to be moved to a locking position, is then used for maintaining the correct rotary angle orientation reached, without any additional measures being necessary.

To this end, the positioning element is preferably acted upon by a spring.

When the positioning element has not only a locking position but also a stand-by position, this will reduce the response time.

The positioning element is preferably configured as a spring-loaded rocking lever, since the latter has a particularly short response time.

The response time is reduced still further, when the positioning element is provided with an engagement projection and when the orientation mark is provided with an engagement recess, since the projection can thus immediately engage the recess, whereas, if these elements were arranged the other way round, the positioning element would have to be raised first.

The relative movement between the holders of the two conveying units, which are used for rotating the product, can be realized in a particularly simple manner when at least one of the conveying units, preferably, however, both said conveying units, have an at least approximately circular conveying path.

The rotary drive for the product can be derived even more easily from the relative movement of the holders when the conveying paths of the first and second conveying units overlap in the transfer region, so that the relative movement can be tapped directly. In this respect, it will be particularly advantageous when not only the conveying paths but also the holders of the first and second conveying units overlap in the transfer region, so that the product will still be held by the first holder when it is already located in the access region of the second holder and of the orienting means associated with said second holder, and will be able to rotate about its longitudinal axis in said first holder until it has reached its predetermined position of orientation relative to the second holder.

BRIEF DESCRIPTION OF THE DRAWINGS

An embodiment of the present disclosure will be explained hereinbelow in more detail on the basis of the drawings, in which.

DETAILED DESCRIPTION OF THE PREFERRED EMBODIMENT

Figure 1:
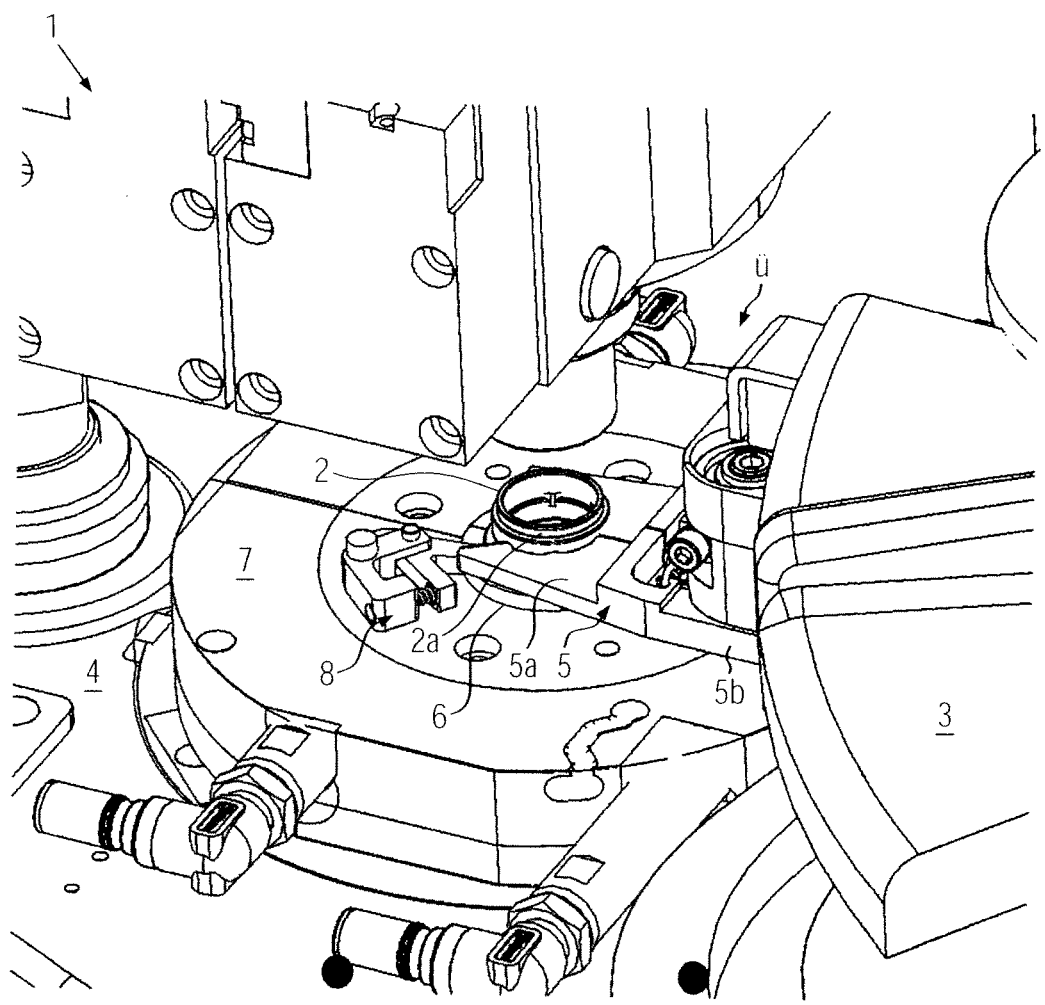
FIG. 1 shows an enlarged, simplified fragmentary view of a transfer region between a first and a second conveying unit.

FIG. 1 shows a transfer region Ü in an apparatus 1 for handling a container product, in particular a container or a preform. The figure shows an apparatus for producing a container from a preform 2. The apparatus 1 comprises a first conveying unit 3 and a second conveying unit 4. The term "conveying unit" stands for any device which is capable of moving a preform 2 or a container that has been stretch blow molded from the preform over a certain distance. In the embodiment shown, the first conveying unit 3 is a transfer star wheel which takes over preforms from a preceding treatment, e.g. directly from the injection molding device or from a heat treatment device, and transfers them to the second conveying unit 4, which is implemented as a blow molding machine in the embodiment shown. Heating can be effected by means of infrared radiation, but also by electromagnetic radiation, such as microwave radiation.

Figure 2:
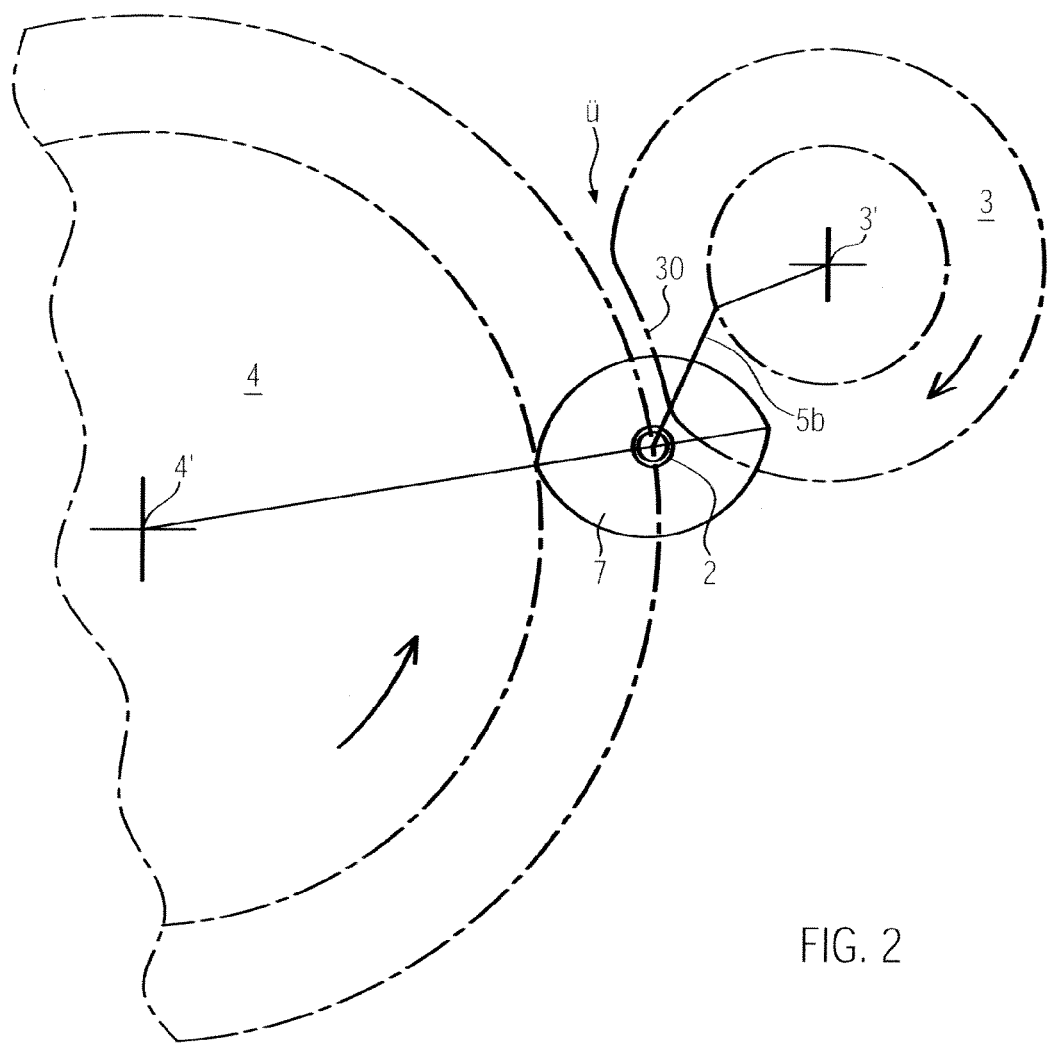
FIGS. 2 to 4 show schematic representations of the relative movement between the two conveying units.
Figure 3:
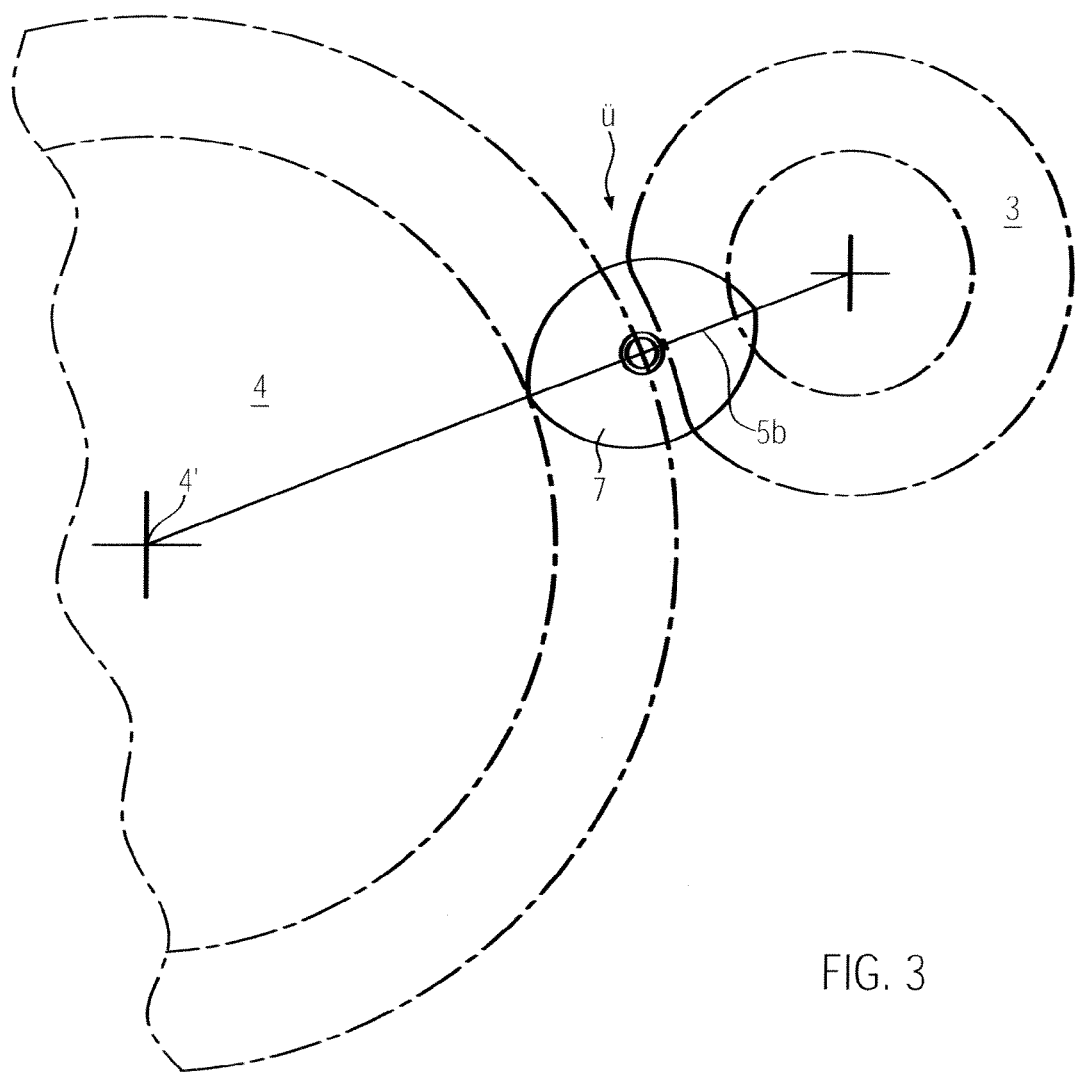
Figure 4:
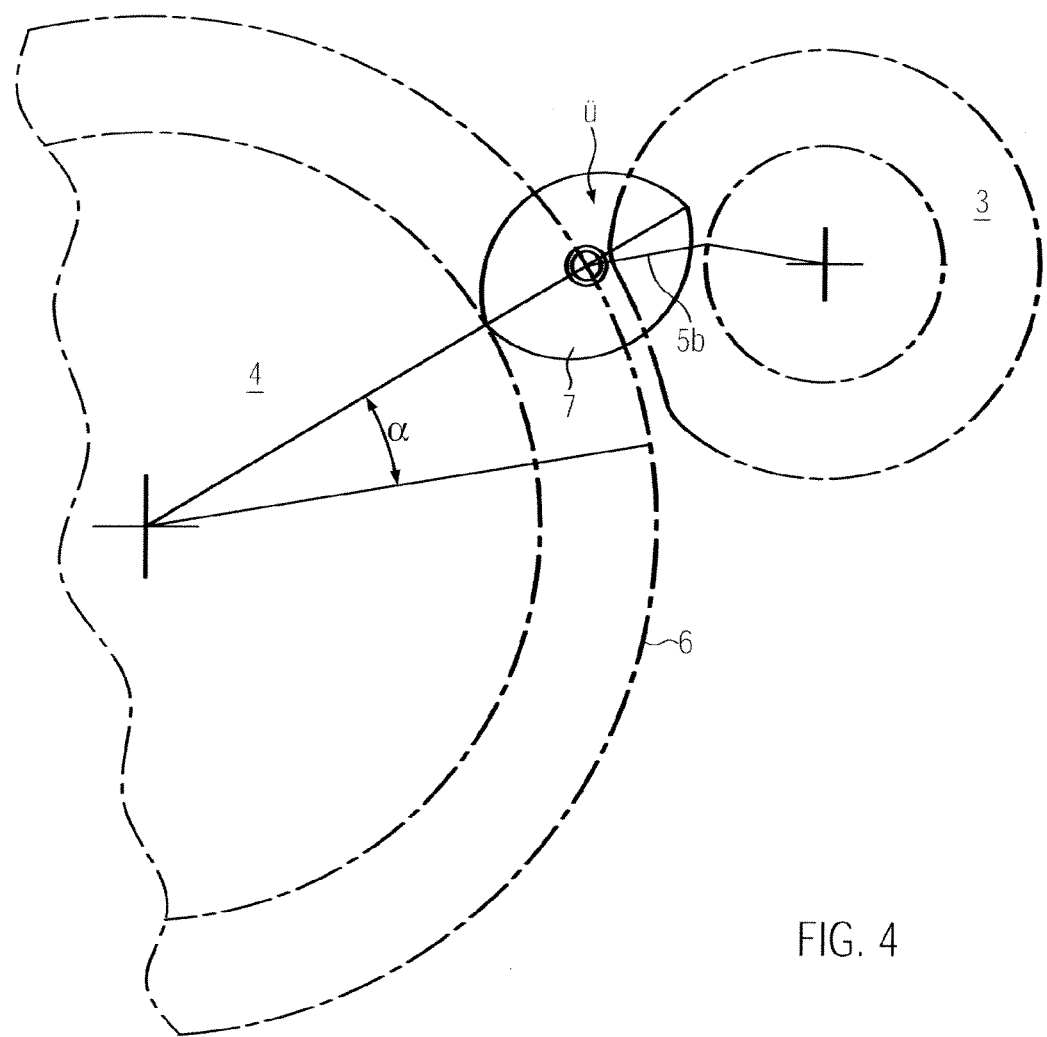

As can be seen from FIGS. 2 to 4, both conveying units 3, 4 have a conveying path defining an at least approximately circular track around a respective axis 3' and 4', the axis in question extending perpendicularly. The first conveying unit 3 has a large number of holders 5 on its circumference, which, in the embodiment shown, each comprise gripping tongs 5a, said gripping tongs 5a being capable of engaging below a collar 2a, which is arranged on the preform 2, and holding the preform 2 in this way with a perpendicularly extending centre axis 2' and with the opening facing upwards. The gripping tongs 5a are arranged on a pivot mil 5b, which pivots about the axis 3' of the first conveying unit 3 and which is able to execute compensation movements in a (cam-) controlled manner. The pivot arm is part of a pitch adaptation star wheel. Its movement is controlled by two cam control means so as to adapt the preforms coming from the oven to the pitch of the blow mold. To this end, the preforms must be accelerated accurately, and this necessitates a special cam control path. It follows that the pivot arm is normally deflected from the radial orientation, but at the point of maximum approach of the two conveying units it is oriented precisely radially.

FIGS. 2 to 4 show only one of the cam control means and there only a cam control region 30 which guarantees that the holders 5, 6 with the preforms 2 will move parallel to one another in the transfer region Ü. Another cam control means, which is not shown, is provided, which guarantees that the pivot arm 5b will appropriately be deflected from its radial orientation to the axis 3' so as to compensate the peripheral speed of the two conveying units 3, 4 as well as a possibly existing pitch shift between the holders 5 and the holders 6.

The holder 5 of the first conveying unit 3 is preferably able to slightly swerve under the influence of respective forces, e.g. in the radial or circumferential direction with respect to the axis of rotation 3', so as to avoid damage being caused to the preform.

Also the second conveying unit 4 has a holder 6 for the preform 2, said holder 6 being here defined by an outlet area of a blow mold 7. The blow mold 7 is separable in the usual way, without this being visible in FIG. 1, so that the preform 2 can be inserted and the finished container removed. In the area of the holder 6, the blow mold 7 is in close contact with the preform so that the preform 2 is secured in position in the holder 6.

As can be seen from FIG. 1, the conveying paths of the holders 5 and 6 overlap in the transfer region Ü so that the preform can be inserted in the blow mold in the usual way. This insertion is, however, carried out such that the preform can still be held by the first holder 5 when it has already been positioned in the second holder 6.

FIGS. 2 to 4 show the conditions of movement in the transfer region Ü. In FIG. 2 the holder 5, which advances the preform 2, as well as the blow mold 7 with the holder 6 move into the transfer region Ü. The first and the second conveying units 3, 4 move in opposite directions but preferably at the same speed so that, due to the cam control via the cam control region 30, said conveying units 3, 4 accompany each other as regards their movement. A look at the various positions of the holder 5 with its pivot arm 5b at the point of intersection with the preform 2 with respect to the radial orientation of the blow mold 7 relative to the axis of rotation 4' of the second conveying unit 4 shows that the holders 5 and 6 move relative to one another, said movement taking place through a rotary angle range and also the preform placed in the first holder 5 will then, of course, be rotated about its longitudinal axis 2' through this rotary angle range. This relative movement is supported and increased still further when the holder 5 includes a pivot arm 5b which is able to move relative to the blow mold 7 due to the rotation of the first conveying unit 3. By providing an expedient structural design, it can be achieved that the two holders 5, 6 travel in an accompanying movement through a comparatively large angular range α, which is e.g. a range of approximately 25° to 40° or 15 cm to 45 cm. On the basis of this angular range, a rotation of the preform 2 through an angular range of ±10° can be accomplished in the manner described hereinbelow. Even in the case of only coarsely preoriented preforms, this will fully suffice to obtain an exact rotary angle position of the preform 2 in the blow mold 7.

Figure 7:
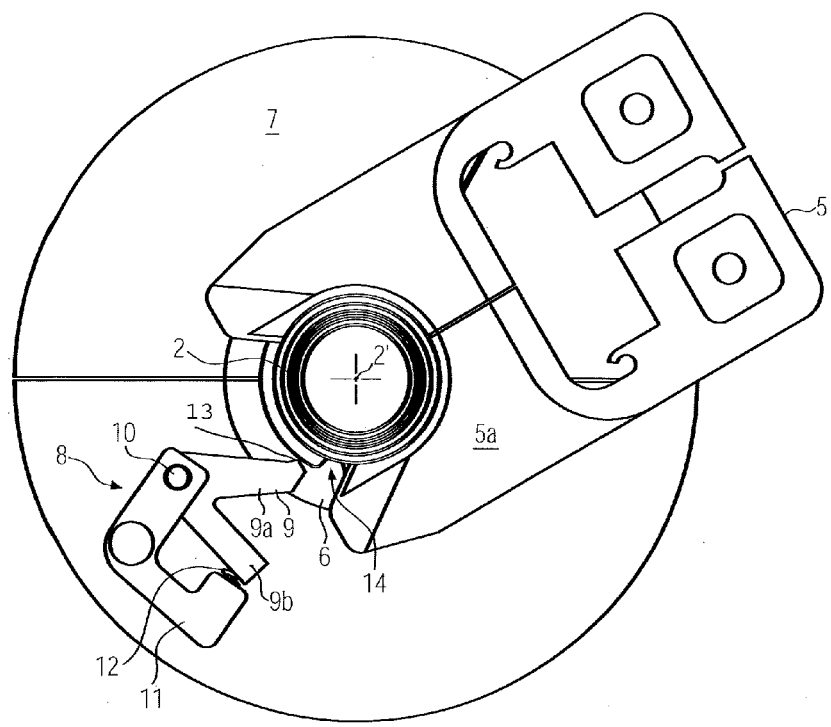
FIG. 7 shows a top view of the transfer region according to FIG. 1 with the positioning element at a stand-by position.
Figure 8:
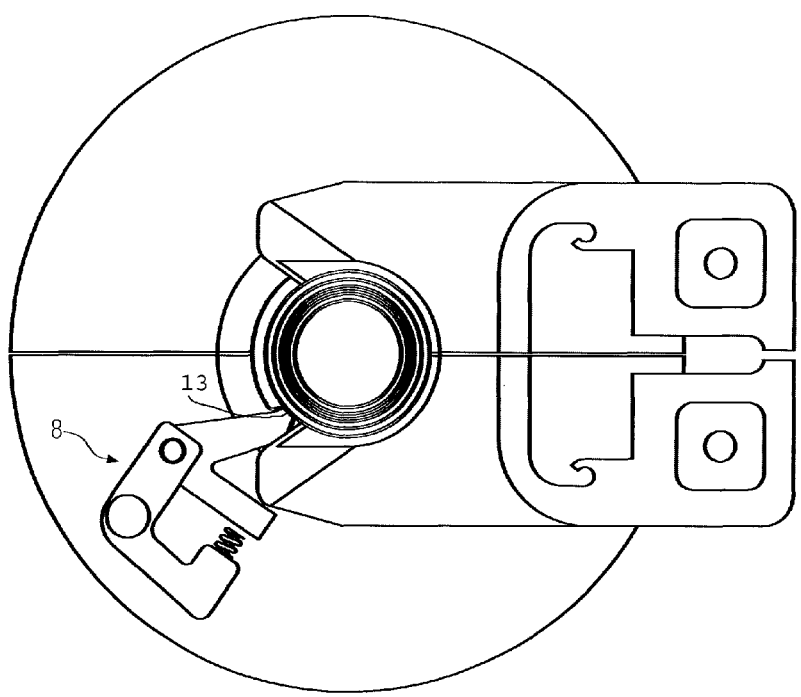
FIG. 8 shows a representation similar to that shown in FIG. 7, with the positioning element at the locking position.

To this end, an orienting means 8 is provided, which is shown in more detail in FIGS. 1, 7 and 8. The orienting means 8 includes a positioning element 9 configured as a rocking lever or a detent in the embodiment shown. The positioning element 9 comprises a first arm 9a and a second arm 9b extending at an angle relative thereto. The positioning element 9 is pivotable about a pivot axle 10. The pivot axle 10 is arranged between the two arms 9a, 9b. The pivot axle 10 extends substantially parallel to the longitudinal centre line 2' of the preform 2. The positioning element 9 is secured to a support 11 via the pivot axle 10, said support 11 being arranged on the upper side of the blow mold 7. A spring 12 acting on one of the aims 9b of the positioning element 9 is arranged between the support 11 and the positioning element 9. In the embodiment shown in FIGS. 7 and 8, the other arm 9a of the positioning element 9 is provided with an engagement projection 13 dimensioned and configured for engaging an orientation mark 14, which is formed on the preform 2 as a recess (cf. also FIG. 5), such that the positioning element 9 will hold the preform 2 and will be able to rotate it against the holding force in the holder 5. The projection 13 is additionally dimensioned and configured such that, when it engages the orientation mark 14, it will prevent any further rotation of the preform relative to the second holder 6 and in both directions about the longitudinal centre line 2', i.e. it will lock the preform 2 at a predetermined position relative to the blow mold 7. This locked position is shown in FIG. 8.

Figures 5, 6:
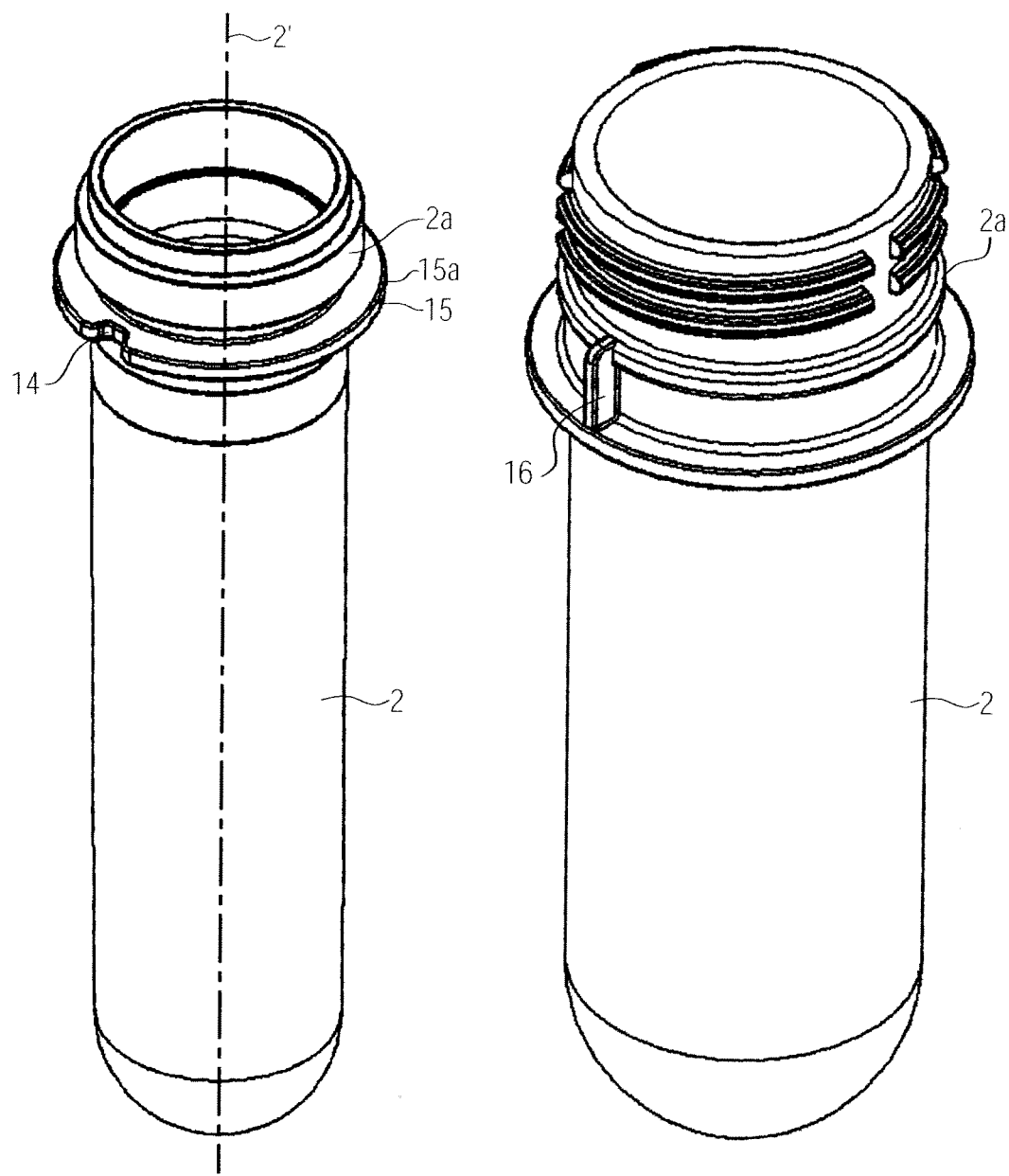
FIG. 5 shows a first embodiment of a preform that is adapted to be used for the present apparatus and method.
FIG. 6 shows a second embodiment of a preform that is adapted to be used for the present apparatus and method.

As can be seen in FIG. 5, the recess 14 is provided in a radially outwardly projecting collar 15 of the preform 2, said collar 15 being arranged below the neck collar 2a in spaced relationship therewith and having provided thereon a cylindrical running surface 15a. The projection 13 of the positioning element 9 abuts on this running surface 15a when the projection 13 is not located in the recess 14. At this position, the spring 12 is compressed so that the positioning element 9 is pressed against the circumferentially extending running surface 15a under pretension. A stand-by position (FIG. 7) of the positioning element 9 is defined in this way. The positioning element, which is acted upon by the spring 12, can move from this stand-by position immediately and without delay to the locked position (FIG. 8) as soon as the holders 5 and 6 have moved relative to one another to a position at which this is possible.

Once the projection 13 has entered the recess 14, the preform 2 is locked against any further rotation relative to the second holder 6 and, consequently, relative to the blow mold 7. The gripping engagement between the first holder 5 and the preform 2 is not so tight that damage will be caused to the preform 2 when it is still positioned in said first holder 5, but the first holder 5 allows the preform 2 to slip. It is, however, also possible to take measures for opening the holder 5 as soon as the positioning element 9 occupies its locked position, i.e. as soon as the projection 13 is located in the recess 14.

As can be seen from FIG. 1, the holder 5 is positioned above the positioning element 9, i.e. the positioning element 9 is arranged between the holder 5 and the holder 6 of the conveying unit 4. Preferably, the holder 6 of the conveying unit 4 is provided with a recess for the positioning element 9, in particular for one of the arms 9a of the positioning element 9. In this way, the holder 5 can retract when it leaves the transfer region Ü, whereas the positioning element 9 remains in its locking position.

Also a projection 16 of the type shown in FIG. 6 may be used as an orientation mark for the purposes of the present disclosure. The projection 16 may preferably serve as a stop. According to a further embodiment, the arm 9a of the positioning element 9 may be configured such that it has a recess in the projection 13 so that it can be brought into positive engagement with the projection 16. Both the recess and the projection may also have additional functions, i.e. they may, for example, serve as a thread stop when a closure is intended to occupy a specific position on a container.

Orienting may also be necessary in cases where the coloring with respect to the axis of rotation of multi-colored preforms must be at a precise angle relative to said axis of rotation for the purpose of treatment, as described e.g. in DE 20 2008 016 006.

Multi-colored preforms can be oriented by means of the above described recesses and projections, but it is also possible to use, instead of the mechanical orientation means, the color itself as an orientation mark and to make use of a color recognition means which will e.g. open the holder 5 as soon as the preform has the predetermined color orientation with respect to the blow mold.

According to a preferred embodiment, which may also be used independently of the above described structural design of the apparatus for handling a container product, preforms having different colors in the circumferential direction are first heated in a microwave heater and then conveyed into a blow mold for expansion by means of compressed air. All the areas having different colors can here be heated uniformly in the microwave heater. Such uniform heating cannot easily be accomplished by conventional infrared ovens, since e.g. black areas have an absorption behavior that is different from that of transparent areas. Between the microwave heater and the blow molding device (or within one of said devices) said preform can be radially oriented such that respective areas having a specific color will be expanded onto the blow mold surfaces provided for this purpose. The blow molding device may comprise a plurality of blow molds arranged on a rotating wheel.

As a modification of the above described and specified embodiment, the orientation device according to the present disclosure may also be provided between other conveying units in which it is important to accomplish and maintain a specific rotary angle orientation of the preform. The positioning element may have a great variety of different structural designs, i.e. it may also be implemented as a radially loaded and linearly moving detent. The disclosure is also suitable for use with other conventional holders for preforms. Furthermore, the conveying units need not necessarily have circular paths of movement, provided that care is taken that the rotary angle orientation of the preform changes when the preform passes through a transfer region between the two conveying units.

The invention claimed is:

1. An apparatus for handling a container product, in particular a container or a preform for producing a container, comprising the product being provided with an orientation mark and adapted to be rotated to a predetermined rotary angle position relative to a holder, an orienting means arranged at a transfer site between a holder of a first conveying unit and a holder of a second conveying unit, at which the holders move relative to one another in an accompanying movement, and that the rotary movement of the product to the predetermined rotary angle position is derived from the relative movement of the holders, wherein the conveying unit is a blow molding station for producing containers and the first conveying unit is a transfer star wheel for supplying preforms to the blow molding station.

* * * * *